(12) United States Patent
Monaghan

(10) Patent No.: US 11,202,977 B2
(45) Date of Patent: Dec. 21, 2021

(54) STRAINER AND AN ASSOCIATED PUMPING METHOD

(71) Applicant: Jets Innovations Pty Ltd, Orange (AU)

(72) Inventor: Tom Monaghan, Bathurst (AU)

(73) Assignee: Jets Innovations Pty Ltd, Orange (AU)

( * ) Notice: Subject to any disclaimer, the term of this patent is extended or adjusted under 35 U.S.C. 154(b) by 0 days.

(21) Appl. No.: 15/561,020

(22) PCT Filed: Mar. 8, 2016

(86) PCT No.: PCT/AU2016/050160
§ 371 (c)(1),
(2) Date: Sep. 22, 2017

(87) PCT Pub. No.: WO2016/149741
PCT Pub. Date: Sep. 29, 2016

(65) Prior Publication Data
US 2018/0050287 A1    Feb. 22, 2018

(30) Foreign Application Priority Data
Mar. 24, 2015 (AU) ............................. 2015901050
Jun. 19, 2015 (AU) ............................. 2015902356

(51) Int. Cl.
*B01D 29/33*    (2006.01)
*F16L 55/24*    (2006.01)

(52) U.S. Cl.
CPC .............. *B01D 29/33* (2013.01); *F16L 55/24* (2013.01)

(58) Field of Classification Search
CPC ................................................ Y10T 137/2829
See application file for complete search history.

(56) References Cited

U.S. PATENT DOCUMENTS 2,173,256 A * 9/1939 Jordan .................. B01D 33/04
                                                        210/783
3,163,229 A    12/1964 Salisburg
(Continued)

FOREIGN PATENT DOCUMENTS

DE    10052166 A1 *  6/2001 ............. B01D 29/33
EP     2056011 A2 *  5/2009 ............. F16L 47/16
(Continued)

OTHER PUBLICATIONS

English Machine Translation of DE10052166A1.*
(Continued)

*Primary Examiner* — Jason M Greene
*Assistant Examiner* — Eric J McCullough
(74) *Attorney, Agent, or Firm* — Brown & Michaels, PC

(57) ABSTRACT

As shown for example in FIG. (5), the strainer (13) has a body (2) that defines a plurality of inlet holes (3). Each of the inlet holes (3) is in fluid communication with a hollow internal chamber. In use, liquid is sucked through the holes (3), thereby straining out larger contaminants such as rocks and stones, into the hollow internal chamber and then out the outlet. The majority of the strainer (13), is formed from a resilient deformable material that allows opposed sides of the internal chamber to be brought into contact with each other in response to the application of a compressive force. Once the force is no longer being applied, the resilience of the material allows the body (2) to resiliently return to substantially its pre-deformation shape.

26 Claims, 6 Drawing Sheets

(56) References Cited

U.S. PATENT DOCUMENTS

| | | | |
|---|---|---|---|
| 3,323,536 A * | 6/1967 | O'Connor | F04B 53/10 |
| | | | 137/140 |
| 3,421,631 A | 1/1969 | Hirsch | |
| 3,817,390 A | 6/1974 | Maruniak et al. | |
| 4,647,374 A | 3/1987 | Ziaylek et al. | |
| 4,973,405 A | 11/1990 | Kozey | |
| 5,063,959 A * | 11/1991 | Peterson | E04D 13/0404 |
| | | | 137/140 |
| 5,409,608 A | 4/1995 | Yoshida et al. | |
| 5,489,385 A * | 2/1996 | Raabe | A61M 1/3627 |
| | | | 210/435 |
| 5,803,179 A | 9/1998 | Echols et al. | |
| 6,006,829 A * | 12/1999 | Whitlock | B01D 29/15 |
| | | | 166/228 |
| 6,468,427 B1 * | 10/2002 | Frey | A61M 1/3627 |
| | | | 210/497.01 |
| 8,128,719 B1 * | 3/2012 | Heckel | B01D 29/111 |
| | | | 55/300 |
| 8,834,713 B1 | 9/2014 | Merrett | |
| 9,328,227 B2 * | 5/2016 | Jagst | C08K 5/098 |
| 2010/0036038 A1 * | 2/2010 | Rodgers | B60C 1/0008 |
| | | | 524/445 |
| 2010/0297452 A1 * | 11/2010 | Funayama | B32B 25/14 |
| | | | 428/413 |
| 2012/0277365 A1 * | 11/2012 | Mercier | C08L 23/16 |
| | | | 524/426 |
| 2012/0329920 A1 * | 12/2012 | Sato | C08K 5/5205 |
| | | | 524/100 |
| 2014/0031468 A1 * | 1/2014 | Schwartz | C08K 3/346 |
| | | | 524/188 |

FOREIGN PATENT DOCUMENTS

| | | | | |
|---|---|---|---|---|
| EP | 2662402 A1 * | 11/2013 | | C08K 5/098 |
| GB | 388247 A | 2/1933 | | |

OTHER PUBLICATIONS

International Search Report for PCT/AU2016/050160 dated May 5, 2016.
Canadian Intellectual Property Office: foreign office action; dated Nov. 6, 2018.
Canadian Intellectual Property Office: foreign office action: dated Sep. 11, 2018.
European Patent Office, European Search Report, dated Oct. 5, 2018.
Huang Wei, edited by Chen Defang, "Handbook of Electrical Insulation Materials," Aug. 1974, first edition, pp. 132 to 133, Water Power Press.

* cited by examiner

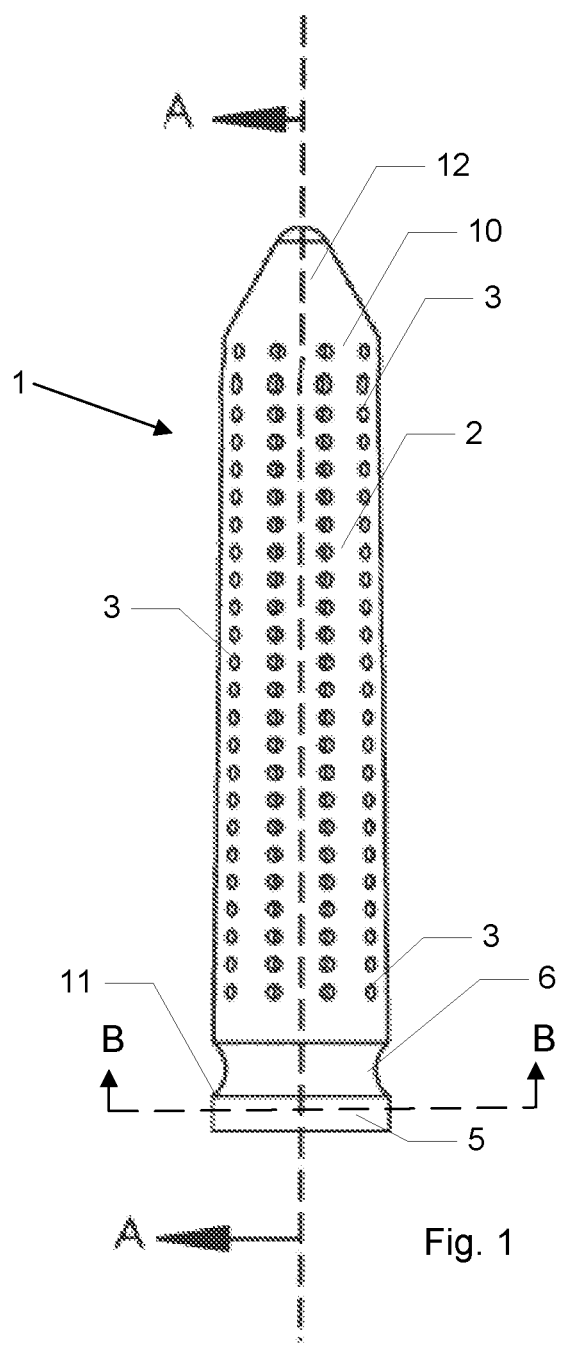
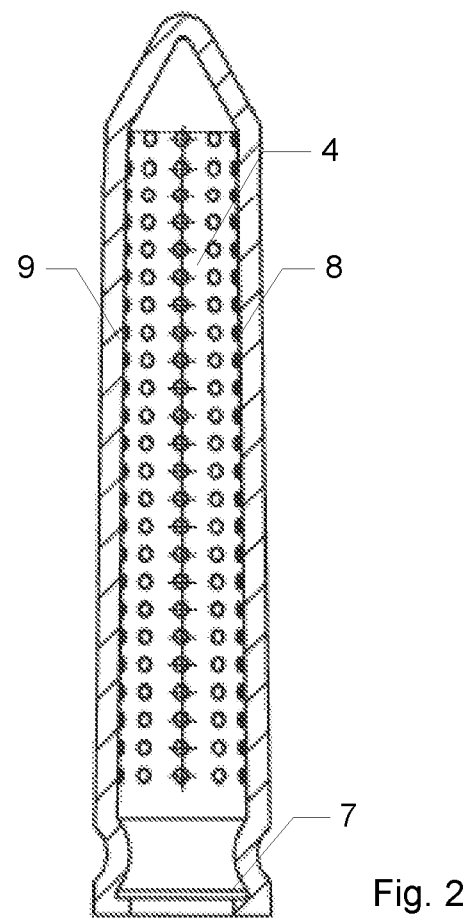
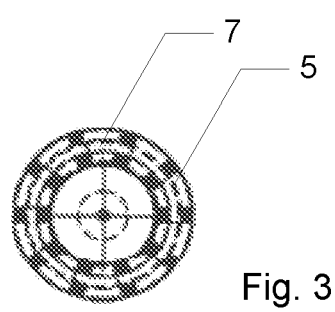
Fig. 1
Fig. 2
Fig. 3

STRAINER AND AN ASSOCIATED PUMPING METHOD

TECHNICAL FIELD

The present invention relates to a strainer that may be attached to the end of a hose into which liquid is to be pumped and an associated pumping method. Embodiments of the present invention find application, though not exclusively, in contexts such as mining and firefighting.

BACKGROUND ART

Any discussion of documents, acts, materials, devices, articles or the like which has been included in this specification is solely for the purpose of providing a context for the present invention. It is not to be taken as an admission that any or all of these matters form part of the prior art base or were common general knowledge in the field relevant to the present invention as it existed in Australia or elsewhere before the priority date of this application.

It is known to attach a strainer to the inlet of a hose when attempting to pump liquids such as water, which may be muddy and may also be contaminated with foreign objects such as rocks and stones, etc. The end of the hose to which the strainer is attached is immersed within the liquid that is to be pumped. The purpose of the strainer is to strain out larger contaminants so that the water that is sucked by the pump into the hose only contains contaminants that are small enough to pass through the strainer.

The inventors of the present application have appreciated that prior art strainers typically suffer from a number of disadvantages such as difficulties associated with the unclogging of contaminants and a vulnerability to crushing or breakage. The latter of these issues is particularly prevalent in a mining contexts, such as coal mining by way of non-limiting example, in which there is an appreciable risk of the strainer being run over and crushed by heavy machinery.

SUMMARY OF THE INVENTION

It is an object of the present invention to overcome, or substantially ameliorate, one or more of the disadvantages of the prior art, or to provide a useful alternative.

In one aspect of the present invention there is provided a strainer for attachment to an inlet of a hose, the strainer including:
 a body defining a plurality of inlet holes, each of the inlet holes being in fluid communication with a hollow internal chamber; and
 an outlet being in fluid communication with the hollow internal chamber, the outlet being for attachment to the inlet of the pump hose;
 wherein the body is formed from a resilient deformable material such that opposed sides of the internal chamber may be brought into contact with each other in response to the application of a compressive force prior to the body resiliently returning substantially to its pre-deformation shape when the force is no longer applied.

In one embodiment the resilient deformable material is, or includes, an elastomeric polymer. In another embodiment the resilient deformable material is, or includes, a rubber, synthetic rubber or rubber-like material. In yet another embodiment the resilient deformable material is, or includes, polychloroprene. In yet another embodiment the resilient deformable material is, or includes, nitrile.

According to another aspect of the present invention there is provided a method of pumping a liquid including:
 providing a pump attached to a hose, the hose having a distal end defining an inlet;
 attaching the outlet of a strainer as described above to the inlet of the hose;
 operating the pump so as to suck the liquid into the plurality of holes, through the hollow chamber, through the outlet and into the hose.

Preferably the method includes periodically reversing the flow direction of the pump such that liquid is pumped out of the holes so as to dislodge contaminants clogging the holes.

Also preferably the method includes periodically detaching the strainer and impacting the strainer against a solid object so as to dislodge contaminants clogging the holes.

The features and advantages of the present invention will become further apparent from the following detailed description of preferred embodiments, provided by way of example only, together with the accompanying drawings.

BRIEF DESCRIPTION OF THE ACCOMPANYING DRAWINGS

FIG. 1 is a plan view of a first embodiment of the strainer;

FIG. 2 is a cross sectional view of the first embodiment of the strainer, with the cross section taken through line A-A of FIG. 1;

FIG. 3 is a cross sectional view of the first embodiment of the strainer, with the cross section taken through line B-B of FIG. 1;

DETAILED DESCRIPTION OF PREFERRED EMBODIMENTS OF THE INVENTION

Figure 4:
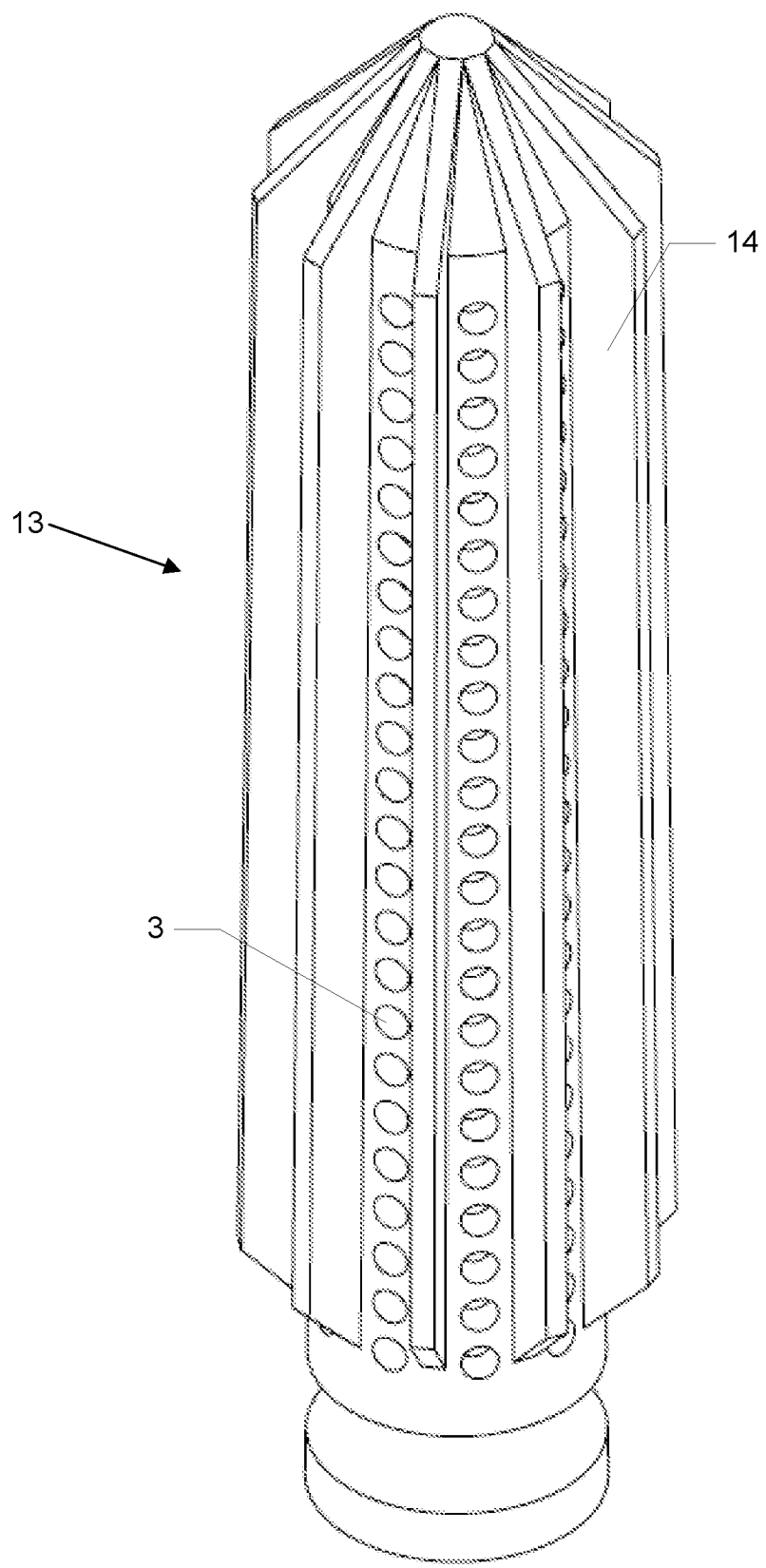
FIG. 4 is a perspective view of a second embodiment of the strainer.
Figure 5:
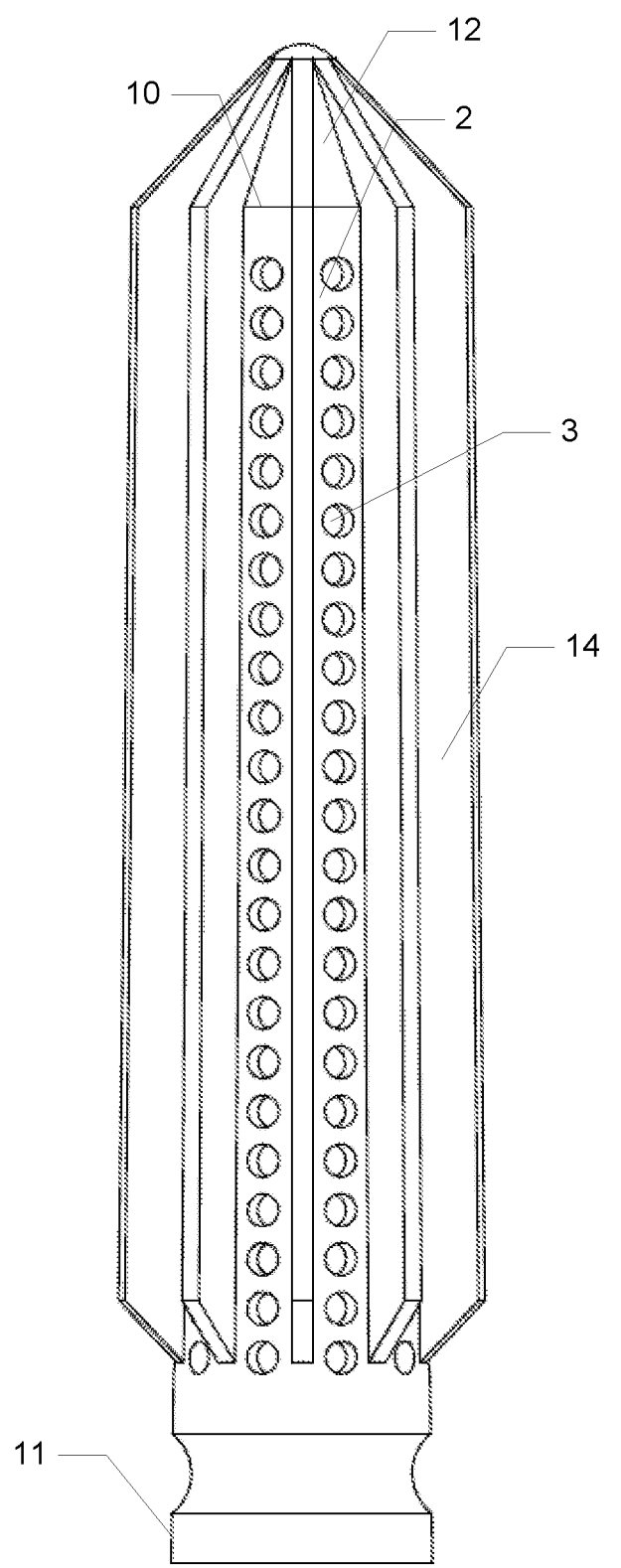
FIG. 5 is a plan view of the second embodiment of the strainer.
Figure 6:
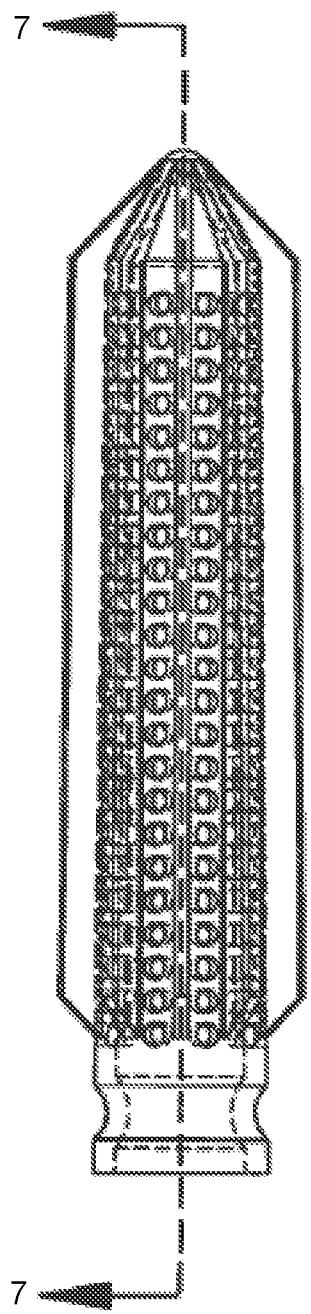
FIG. 6 is a plan view of the second embodiment of the strainer showing some hidden detail.
Figure 7:
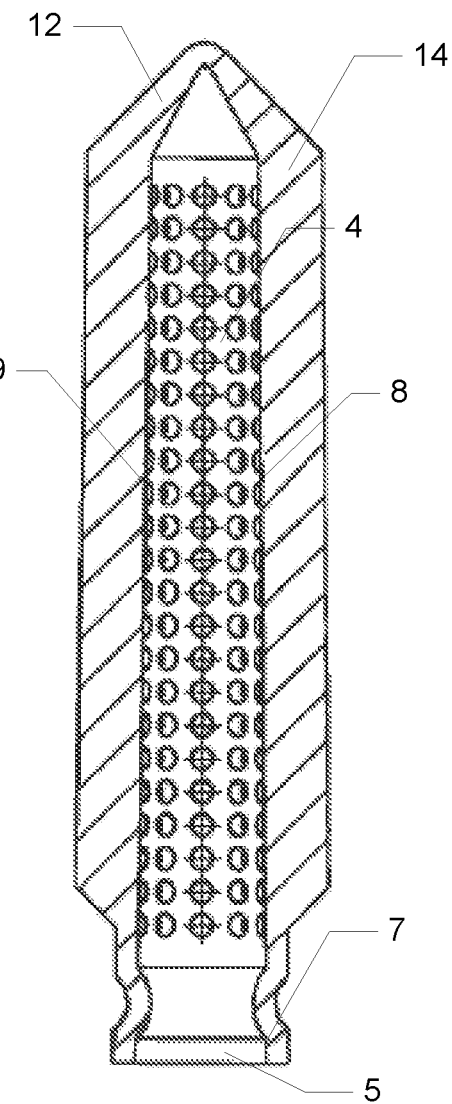
FIG. 7 is a cross sectional plan view of the second embodiment, with the cross section being taken through line 7-7 of FIG. 5.
Figure 8:
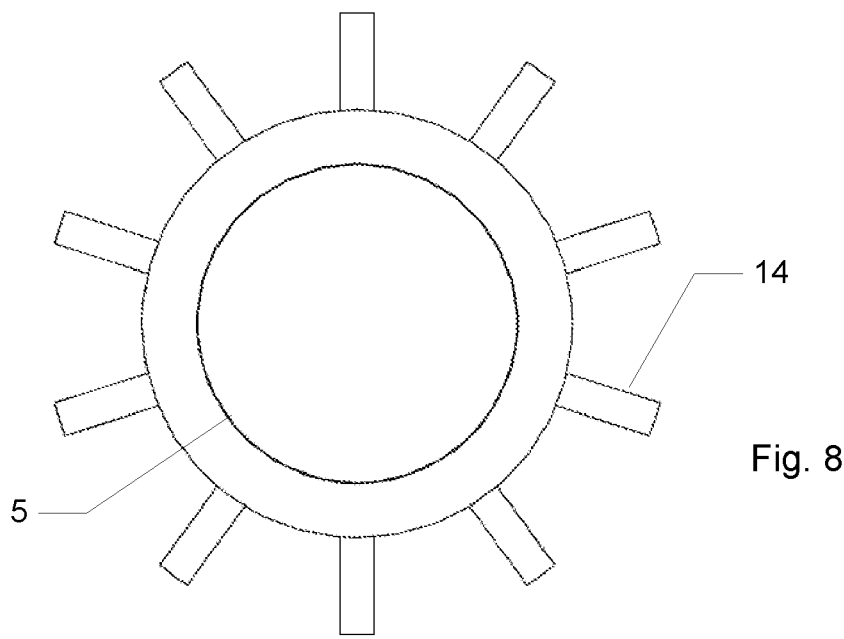
FIG. 8 is a rear view depicting the proximal end of the second embodiment.
Figure 9:
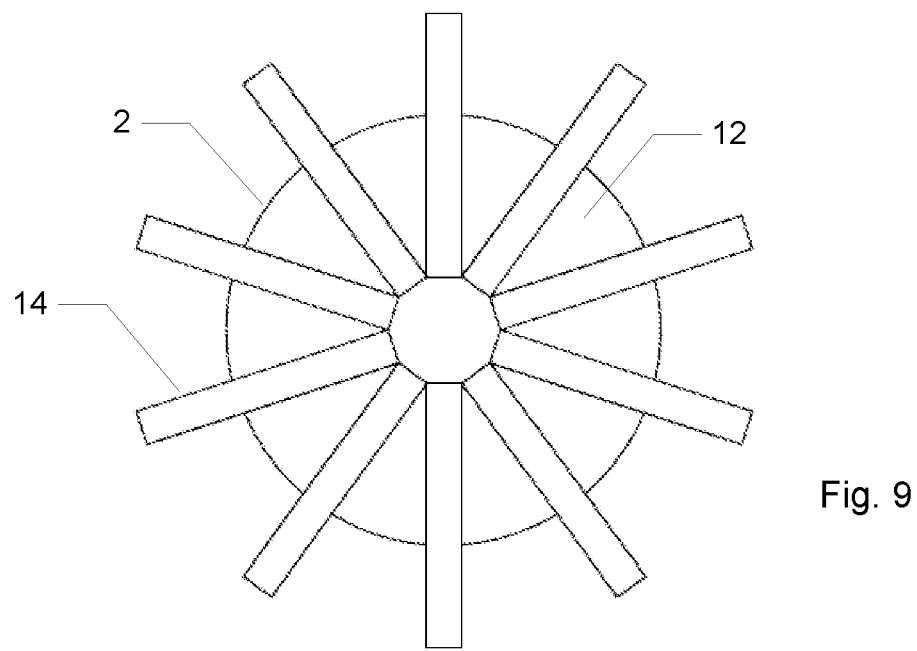
FIG. 9 is a front view depicting the distal end of the second embodiment.

With reference to FIGS. 1 to 3, the first embodiment of the strainer 1 has a body 2 that defines a plurality of inlet holes 3. Each of the inlet holes 3 is in fluid communication with a hollow internal chamber 4. The outlet 5 of the strainer is in fluid communication with the hollow internal chamber 4. In use, the strainer 1 is immersed within a liquid that is desired to be pumped. Suction is then provided by a pump (not illustrated) so as to suck the liquid through the plurality of holes 3, thereby straining out larger contaminants, such as rocks and stones. The liquid flows through the holes 3, into the hollow internal chamber 4 and then out the outlet 5.

In use, the outlet 5 is typically attached to the inlet of the hose (not illustrated) that is connected to the pump. A coupling component, in the form of metal ring 7 that is made from 304-316 stainless steel, is embedded within the material that forms the outlet 5 and the remainder of the strainer 1. Connection of the strainer's outlet 5 to the hose is achieved via a hose coupling device (not illustrated), which defines a boss that is shaped to receive the outlet 5 of the strainer 1. A pair of cams are disposed on opposite sides of the boss such that, once the outlet 5 of the strainer 1 has been inserted into the boss, the cams are rotated so as to impinge into a groove 6 that extends circumferentially around the strainer 1 immediately adjacent to the embedded metal ring 7. The impinging cams retain the metal ring 7 within the boss, thereby connecting the strainer 1 to the hose coupling device. To release the strainer 1, the cams are rotated in the opposite direction so as to provide clearance for the outlet 5 and its embedded metal ring 7 to be withdrawn from the boss. At the opposite end to the boss, the hose coupling device has a shaft that is sized so as to be inserted into the hose. The shaft includes a plurality of ridges that are shaped so as to resist withdrawal of the hose.

Other embodiments of the invention utilise varying means to connect the strainer to the hose. For example, in another embodiment (not illustrated) a screw thread is formed adjacent the outlet of the strainer. This allows the outlet of the strainer to be screwed into a corresponding screw thread that is provided within a boss of a hose connection device.

The body 2, and indeed the entire strainer 1 with the exception of the metal ring 7, is formed from a resilient deformable material. The deformability of the material is such that opposed sides 8 and 9 of the internal chamber 4 can be brought into contact with each other in response to the application of a compressive force. Once the force is no longer being applied, the resilience of the material allows the body 2 to resiliently return to substantially its pre-deformation shape.

The preferred embodiment has passed a test that involved the application of a 100 tonne compressive force. As will be appreciated by those skilled in the art, the application of a 100 tonne compressive force causes the hollow internal chamber to be crushed substantially flat prior to the body resiliently returning substantially to its pre-deformation shape when the compressive force is no longer applied. Hence, in use, the strainer 1 is capable of surviving the application of the type of substantial compressive force that may be experienced in a mining context, such as being run over by a heavy hauling mining vehicle. This compares favourably with the prior art strainers of which the applicant is aware, which would be crushed and rendered unusable by the application of such a compressive force. This is because the prior art strainers are typically made from either metal or a hard plastics material. Advantageously, the resilient deformable material of the preferred embodiment has a Young's modulus of less than a Young's modulus of metal or a Young's modulus of a hard plastics material.

The reduced risk of damaging the preferred embodiment gives rise to practical benefits such as longer service life and reduced labour costs and down time associated with the repair or replacement of broken strainers. Additionally, the reduced risk of damaging the preferred embodiment reduces the risk that broken parts of the strainer 1 may be sucked into the hose and then into the pump, which advantageously reduces the risk of damaging the pump.

In one embodiment the resilient deformable material from which the strainer 1 is made (with the exception of the metal ring 7) includes an elastomeric polymer such as a rubber, synthetic rubber or rubber-like material. More particularly, in one embodiment the material is formed from a combination of: standard Malaysian rubber, such as SMR10; an activator such as zinc oxide and/or stearic acid; an accelerator such as N-cyclohexyl-2-benzothiazole sulphonamide (which is also known by those skilled in the art as CBS); a crosslinking agent such as sulphur; a processing aid such as Struktol A 60 (which is used to reduce viscosity); process oil such as a paraffinic oil; a wax such as a paraffinic wax; an antioxidant and antiozonant such as N-(1,3-Dimethylbutyl)-N'-phenyl-p-phenylenediamine (which is also known by those skilled in the art as 6PPD) and/or N-Isopropyl-N'-phenyl-p-phenylenediamine (which is also known by those skilled in the art as IPPD and which is used to protect the rubber); and semi re-enforcing carbon black such as N774 (which is used to increase tensile strength).

In another embodiment the resilient deformable material includes polychloroprene (which is also referred to by those skilled in the art as neoprene). More particularly, in this embodiment the resilient deformable material is formed from a combination of: polychloroprene; a cure system and crosslinking agent such as zinc oxide and/or Ethylene thiourea (which is also known by those skilled in the art as ETU) and/or Tetramethylthiuram disulfid (which is also known by those skilled in the art as TMTD); a processing aid such as stearic acid and/or Struktol WB212 (which is used as an emulsion plasticizer dispersing and processing additive); a flame retardant such as antimony trioxide and/or chlorinated polyethylene and/or alumina trihydrate and/or zinc borate; an acid acceptor such as magnesium oxide; an antioxidant and antiozonant such as N-(1,3-Dimethylbutyl)-N'-phenyl-p-phenylenediamine (which is also known by those skilled in the art as 6PPD); and semi re-enforcing carbon black such as N330.

In another embodiment the resilient deformable material is, or includes, nitrile, which is an organic compound that has a —C≡N functional group.

It will be appreciated that the material must be soft enough to deform in response to compressive forces; however hard enough to resist collapsing due to the vacuum created by the pump. The resilient deformable material preferably has a Shore A hardness of between 45 and 70 and the embodiment has a Shore A hardness of 55. Additionally, it is preferable for the material to be UV resistant, petrochemical resistant, heat resistant, fire retardant and to have antistatic properties. With regard to petrochemical resistance, the natural rubber material has fairly poor properties. However, the polychloroprene-based material has good to excellent petrochemical resistance. Additionally, the material may be operated in ambient temperatures ranging from −66° C. to +100° C.

The natural rubber-based material has a tensile strength of approximately 19 Mpa and can be extended by up to 450% before breakage. The polychloroprene-based material has a tensile strength of approximately 16.9 Mpa and can be extended by up to 375% before breaking.

The preferred embodiment of the strainer 1 is formed using an injection moulding process using an ENGEL 150 Tonne Clamp injection moulding machine, which has two cavities. The cavities hold dies that are shaped in the negative form of the strainer 1 and each die includes a central post that forms the hollow internal chamber 4 of the strainer 1. Prior to injection of the material, a metal ring 7 is placed into each of the cavities so as to rest on the central post and the metal rings are retained in position by clipping onto studs. If using the natural rubber-based material, then it is heated to 170° C. prior to injection. Alternatively, if the polychloroprene-based material is being used, then it is heated to a pre-injection temperature of 175° C. The heated material is then injected into each of the cavities to make two of the strainers 1. If using the natural rubber-based material, then 0.976 litres of material per unit is injected into each cavity. Alternatively, if the polychloroprene-based material is being used, then 0.965 litres of material per unit is injected into each cavity.

If desired, it is also possible to add colouring agents to the material so that the strainer 1 may be made in a selected colour.

The strainer 1 is of a unitary construction, which allows for quicker connection of the strainer 1 onto the hose as compared to the prior art strainers of which the applicant is aware. More particularly, the prior art strainer are formed in two parts which must be screwed together when being installed in situ. The preferred embodiment dispenses with the requirement for the installer to screw two separate parts together, which helps minimise the labour costs associated with installing and replacing the strainers.

The combined cross sectional area of the plurality of holes 3 is preferably between 2 and 14 times the cross sectional area of the outlet 5. Such a ratio is desirable to provide the strainer 1 with a suitable resistance against blockage. The first preferred embodiment has a total of 240 holes, which are arranged in 10 rows, each having 24 holes. Each of the holes 3 is 5 mm in diameter and therefore has a cross sectional area of 19.635 mm$^2$. Hence, the total cross sectional area of the plurality of holes 3 is 4712 mm$^2$. At its narrowest (i.e. at a cross section taken in the middle of the groove 6), the outlet is 38 mm in diameter, which gives the outlet a cross sectional area of 1134 mm$^2$. Hence, in the first preferred embodiment the total cross sectional areas of the plurality of holes is 4.15 times the cross sectional area of the outlet 5.

The light weight of the preferred embodiment is another advantage as compared to typical prior art strainers. The preferred embodiment of the strainer 1 weighs less than 1 kg. More specifically, the weight of the preferred embodiment is approx. 370 grams; whereas the prior art metal strainers typically weigh about 2.5 kg The body 2 is in the form of a cylindrical shaft defining a distal end 10 and a proximal end 11. A tapered head 12 is disposed at the distal end 10. The outlet 5 is at the proximal end 11. The tapered head 12 improves the resistance of strainer 1 against the vacuum created by the pump as compared to the resistance that would be provided by a squared off head. That is, the tapered head 12 provides support to maintain the distal end 10 of the body 5 in a cylindrical configuration despite the vacuum created by the pump. This support also helps the strainer to return to its shape quicker after the body 5 has been deformed by a compressive force. Another advantage associated with the tapered head is that it lessens the risk of the strainer 1 being folded in on itself by the vacuum created by the pump. Preferably the tapered head defines an included angle of between 40° and 70° and in the preferred embodiment this angle is 56°.

As can be seen in the figures, the preferred embodiment does not have any sharp edges. This, in addition to the deformability of the material from which the embodiment is predominantly made, helps improve safety for the personnel and reduce the risk of damage to the equipment in the work place in which the strainer 1 is being used.

The method of using the strainer 1 when pumping a liquid typically involves attaching a proximal end of a hose to a pump, with the distal end of the hose defining an inlet. The outlet 5 of the strainer 1 is attached to the inlet of the hose and then the strainer is immersed within the liquid that is to be pumped. The pump is then operated so as to suck the liquid into the plurality of holes 3, through the hollow chamber 4, out the outlet 5 and into the hose. Periodically the flow direction of the pump is reversed so as to pump an amount of liquid, which is typically between 2 to 10 litres, out of the holes 3 and thereby dislodge any contaminants that may be clogging the holes 3. Alternatively, or additionally, the operator may periodically detach the strainer 1 and impact it against a solid object so as to dislodge any contaminants that may be clogging the holes 3. Advantageously, the impacting of the strainer 1 against a solid object is unlikely to damage either the strainer 1, or the object, due to the deformability of the material from which the strainer 1 is formed.

Each of the holes 3 has a circumference of 15.7 mm. Preferably each of these circumferences is extensible by at least 20%. As mentioned above, this degree of extensibility is easily achieved by the material from which the preferred embodiment is made, which has been tested to withstand extension by up to 450% in the case of the natural rubber-based material and up to 375% in the case of the polychloroprene-based material. The deformability and extensibility of the holes 3 is advantageous because it facilitates the methods outlined in the preceding paragraph for unclogging of the holes 3 if they get clogged with contaminants such as stones, etc. That is, the deformability and extensibility of the material allows the holes 3 to expand and re-shaped themselves as required to help eject the contaminants in response to either a reversal of the direction of flow of the pump or in response to impacting of the strainer 1 against a solid object. In comparison, the stiffness of the holes in the prior art strainers can render them substantially more difficult to unclog.

A second embodiment of the strainer 13 is shown in FIGS. 4 to 9. Portions of the second embodiment that are similar to those described above in relation to the first embodiment have been labelled with the same reference numerals as used in FIGS. 1 to 3.

The second embodiment differs in that it is longer than that of the first embodiment. In the second embodiment, the length of the strainer 13 is 370 mm from the proximal end 11 to the distal end 10 (compared to 325 mm in the first embodiment). It will, of course, be appreciated that other embodiments may have differing dimensions.

Another difference between the first and second embodiments is that each of the holes 3 of the second embodiment are 8 mm in diameter (compared to 5 mm in the first embodiment). The second embodiment has a total of 230 holes. Hence, the total cross sectional area of the plurality of holes 3 in the second embodiment is 11,561 mm$^2$, which is substantially greater than the 4,712 mm$^2$ of the first embodiment. This allows the second embodiment to have a flow rate of up to 850 litres per minute. The dimensions of the outlet 5 of the second embodiment are identical to those of the first embodiment. That is, at its narrowest, the outlet 5 is 38 mm in diameter, which gives the outlet a cross sectional area of 1134 mm$^2$. Hence, in the second embodiment the total cross sectional area of the plurality of holes is 10.2 times the cross sectional area of the outlet 5. Hence, as compared to the first embodiment, the second embodiment is less likely to become clogged to such an extent that the total flow through the strainer 13 is appreciably reduced.

The other main difference between the first and second embodiments is that the second embodiment has ten projections 14 spaced equally around the body 2. The projections 14 are respectively positioned between each of the rows of holes 3. Each of the projections 14 is in the form of a rib that extends radially away from the centre of the cylindrical body 2. This maintains a clearance gap between the lowermost holes 3 and a surface upon which the strainer 13 is resting. In use, the strainer 13 typically rests upon the bottom of a body of water with at least two of the ribs 13 making contact with the bottom. Hence, those two ribs hold the lowermost holes 3 up from the bottom of the body of water. This helps to avoid the restriction to the flow through the lowermost holes 3 that would otherwise occur if the lowermost holes 3 were allowed to rest directly against the bottom of the body of water.

Figure 10:
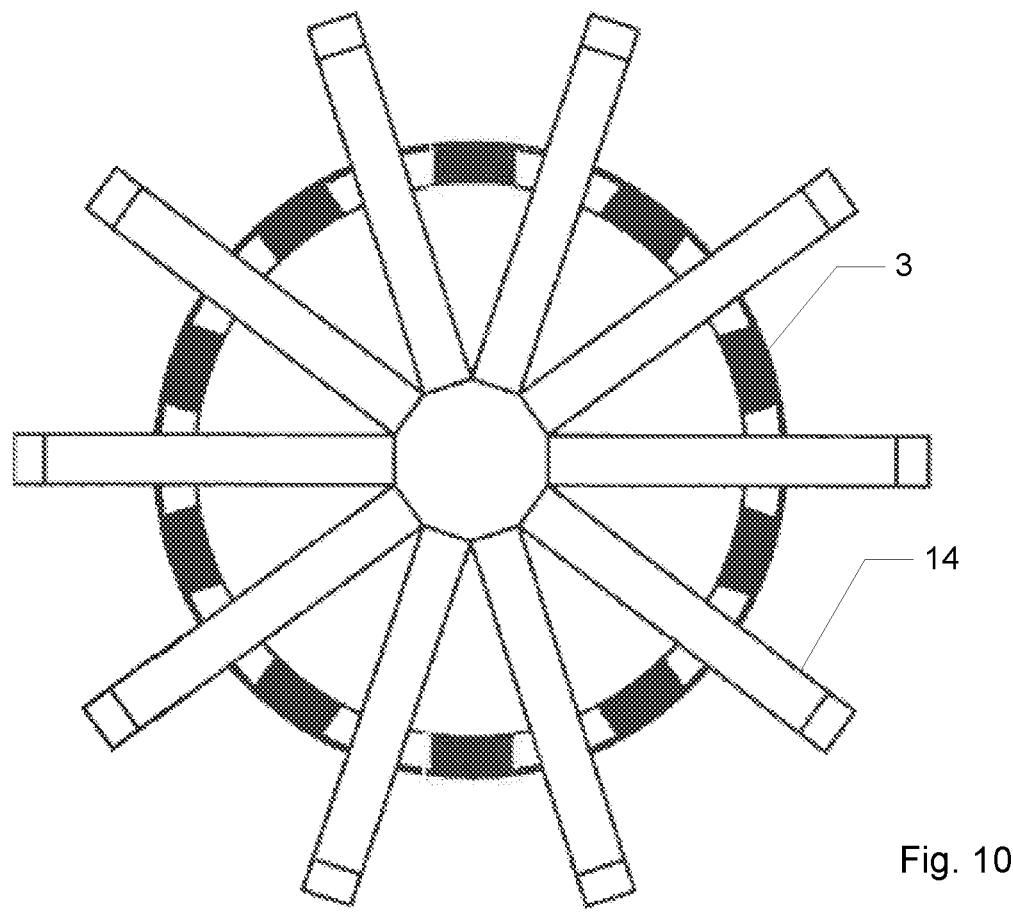
FIG. 10 is a front view of the second embodiment showing some hidden detail comprising the positions of the holes 3.

Another advantage associated with the ribs 14 is their contribution to increasing the structural integrity of the strainer 13 and in particular the ribs 14 provide the strainer 13 with further resistance against being sucked inside-out by the pumping vacuum. Additionally, the presence of the ribs 14 helps to keep any larger objects that may be floating within the body of water away from the inlet holes 3. That is, the presence of the ribs 14 ensures that only objects that are smaller than the gap between two adjacent ribs 14 can get close to the holes 3, as shown for example in FIG. 10.

While a number of preferred embodiments have been described, it will be appreciated by persons skilled in the art that numerous variations and/or modifications may be made to the invention without departing from the spirit or scope of the invention as broadly described. The present embodiments are, therefore, to be considered in all respects as illustrative and not restrictive.

The claims defining the invention are as follows:

1. A strainer for attachment to an inlet of a hose, the strainer including:
   a body defining a plurality of inlet holes, each of the inlet holes being in fluid communication with a hollow internal chamber; and
   an outlet being in fluid communication with the hollow internal chamber, the outlet being to attach to the inlet of the hose;
   wherein the body is formed from a resilient deformable material configured to bring opposed sides of the internal chamber into contact with each other in response to application of a compressive force prior to the body resiliently returning substantially to its pre-deformation shape when the compressive force is no longer applied,
   wherein each of the holes defines a perimeter and wherein each of the holes is extensible to extend the perimeter by at least 20%,
   wherein the resilient deformable material has a Shore A hardness of between 45 and 70, and
   wherein a plurality of ribs is disposed externally upon the body, each of the ribs defining a radial end and having a geometry such that a straight line extending between the radial end of any one of the ribs of the plurality of ribs and the radial end of any second one of the plurality of ribs adjacent the any one rib does not intersect the body, wherein as a result of the strainer resting on a planar surface, the radial ends of the any one rib and the second rib adjacent the any one rib rest upon the planar surface and a clearance gap is maintained between the inlet holes and the planar surface.

2. A strainer according to claim 1, wherein the resilient deformable material is, or includes, an elastomeric polymer.

3. A strainer according to claim 1, wherein the resilient deformable material is, or includes, a rubber, synthetic rubber, or rubber-like material.

4. A strainer according to claim 1, wherein the resilient deformable material is, or includes, polychloroprene.

5. A strainer according to claim 1, wherein the resilient deformable material is, or includes, nitrile.

6. A strainer according to claim 1, wherein the resilient deformable material has a Young's modulus of less than a Young's modulus of a metal.

7. A strainer according to claim 1, wherein the resilient deformable material has a Young's modulus of less than a Young's modulus of a hard plastics material.

8. A strainer according to claim 1, wherein a coupling component is disposed adjacent the outlet.

9. A strainer according to claim 8, wherein the coupling component is a metal ring.

10. A strainer according to claim 9, wherein the metal ring is embedded within the material.

11. A strainer according to claim 1, wherein the strainer is formed by injection moulding.

12. A strainer according to claim 1, wherein the strainer is of a unitary construction.

13. A strainer according to claim 1, wherein the material is formed from a combination of: standard Malaysian rubber; an activator; an accelerator; a crosslinking agent, a processing aid; process oil; a wax; an antioxidant and antiozonant; and semi re-enforcing carbon black.

14. A strainer according to claim 13, wherein:
    the Standard Malaysian Rubber is SMR10;
    the activator is zinc oxide and/or stearic acid;
    the accelerator is N-cyclohexyl-2-benzothiazole sulphonamide;
    the crosslinking agent is sulphur;
    the processing aid is a viscosity reducer;
    the process oil is a paraffinic oil;
    the wax is paraffinic wax;
    the antioxidant and antiozonant is N-(1,3-Dimethylbutyl)-N'-phenyl-p-phenylenediamine and/or N-Isopropyl-N'-phenyl-p-phenylenediamine; and
    the semi re-enforcing carbon black is N774.

15. A strainer according to claim 1, wherein the material is formed from a combination of: polychloroprene; a cure system and crosslinking agent; a processing aid; a flame retardant; an acid acceptor; an antioxidant and antiozonant; and semi re-enforcing carbon black.

16. A strainer according to claim 15, wherein:
    the cure system and crosslinking agent is zinc oxide and/or Ethylene thiourea and/or Tetramethylthiuram disulfid;
    the processing aid is stearic acid and/or an emulsion plasticizer dispersing and processing additive;
    the flame retardant is antimony trioxide and/or chlorinated polyethylene and/or alumina trihydrate and/or zinc borate;
    the acid acceptor is magnesium oxide;
    the antioxidant and antiozonant is N-(1,3-Dimethylbutyl)-N'-phenyl-p-phenylenediamine; and
    the semi re-enforcing carbon black is N330.

17. A strainer according to claim 1, wherein the combined cross sectional area of the plurality of holes is between 2 and 6 times the cross sectional area of the outlet.

18. A strainer according to claim 1, wherein the combined cross sectional area of the plurality of holes is between 6 and 14 times the cross sectional area of the outlet.

19. A strainer according to claim 1, wherein the strainer has a weight of less than 1 kg.

20. A strainer according to claim 1, wherein the body is a cylindrical shaft defining a distal end and a proximal end and wherein a tapered head is disposed at the distal end and wherein the outlet is at the proximal end.

21. A strainer according to claim 20, wherein the tapered head defines an included angle of between 40° and 70°.

22. A strainer according to claim 1, wherein the body is deformable upon the application of the compressive force, configured to crush the hollow internal chamber substantially flat prior to the body resiliently returning substantially to its pre-deformation shape when the compressive force is no longer applied.

23. A method of pumping a liquid including:
    providing a pump attached to a hose, the hose having a distal end defining an inlet;
    providing a strainer including: a body defining a plurality of inlet holes, each of the inlet holes being in fluid communication with a hollow internal chamber; and an outlet disposed at a proximal end of the body, the outlet being in fluid communication with the hollow internal chamber, the outlet being for attachment to the inlet of the hose; wherein the body is formed from a resilient deformable material to bring opposed sides of the internal chamber into contact with each other in response to the application of a compressive force prior to the body resiliently returning substantially to its pre-deformation shape when the force is no longer applied and wherein each of the holes defines a perimeter and wherein each of the holes is extensible to extend the perimeter by at least 20%;
    attaching the outlet of the strainer to the inlet of the hose;
    operating the pump to suck the liquid at a flow rate of a least 850 litres per minute into the plurality of holes, through the hollow chamber, out the outlet, and into the hose; and
    periodically detaching the strainer and impacting the strainer against a solid object to dislodge contaminants clogging the holes,
    wherein the material has a Shore A hardness of between 45 and 70,
    wherein a tapered head is disposed at a distal end of the body,
    wherein a plurality of ribs is disposed externally upon the body, and
    wherein the Shore A hardness, the tapered head, and the plurality of ribs together facilitate resistance of the body to collapse during operation of the pump.

24. A method according to claim 23, including periodically reversing the flow direction of the pump such that liquid is pumped out of the holes to dislodge contaminants clogging the holes.

25. A strainer according to claim 1, wherein each inlet hole has a cross-sectional area, and the outlet has a cross-sectional area, and wherein the cross-sectional area of each inlet hole is at least ten times smaller than the cross-sectional area of the outlet.

26. A strainer for attachment to an inlet of a hose, the strainer including:
    a body defining a plurality of inlet holes, each of the inlet holes being in fluid communication with a hollow internal chamber; and
    an outlet being in fluid communication with the hollow internal chamber, the outlet being to attach to the inlet of the hose;
    wherein the body is formed from a resilient deformable material configured to bring opposed sides of the internal chamber into contact with each other in response to application of a compressive force prior to the body resiliently returning substantially to its pre-deformation shape when the compressive force is no longer applied,
    wherein each of the holes defines a perimeter and wherein each of the holes is extensible to extend the perimeter by at least 20%,
    wherein the resilient deformable material has a Shore A hardness of between 45 and 70, and
    wherein a plurality of ribs is disposed externally upon the body, the plurality of ribs including a first rib and a second rib adjacent the first rib, each of the ribs of the plurality of ribs defining a radial end and having a geometry such that a straight line extending between the radial end of the first rib and the radial end of the second rib does not intersect the body, wherein a clearance gap is maintained between the inlet holes and a planar surface as a result of the radial end of the first rib and the radial end of the second rib resting upon the planar surface.

\* \* \* \* \*